(12) United States Patent  
Schubert

(10) Patent No.: US 9,043,592 B1  
(45) Date of Patent: May 26, 2015

(54) COMMUNICATING TRUST MODELS TO RELYING PARTIES

(71) Applicant: EMC Corporation, Hopkinton, MA (US)

(72) Inventor: Ingo Schubert, Haldenwang (DE)

(73) Assignee: EMC Corporation, Hopkinton, MA (US)

( * ) Notice: Subject to any disclaimer, the term of this patent is extended or adjusted under 35 U.S.C. 154(b) by 9 days.

(21) Appl. No.: 14/033,811

(22) Filed: Sep. 23, 2013

(51) Int. Cl.  
*H04L 9/32* (2006.01)

(52) U.S. Cl.  
CPC .............. *H04L 9/321* (2013.01); *H04L 9/3247* (2013.01); *H04L 9/3263* (2013.01)

(58) Field of Classification Search  
CPC ... H04L 63/0823; H04L 63/08; H04L 9/3263; H04L 9/321; H04L 9/3247; G06Q 20/02  
USPC .......................................... 713/155, 156, 157  
See application file for complete search history.

(56) References Cited

U.S. PATENT DOCUMENTS

| | | | |
|---|---|---|---|
| 2005/0021969 A1* | 1/2005 | Williams et al. | 713/176 |
| 2005/0114701 A1* | 5/2005 | Atkins et al. | 713/201 |
| 2006/0282670 A1* | 12/2006 | Karchov | 713/175 |
| 2011/0004763 A1* | 1/2011 | Sato et al. | 713/175 |
| 2013/0036303 A1* | 2/2013 | Himawan et al. | 713/158 |
| 2013/0085914 A1* | 4/2013 | McPherson et al. | 705/34 |
| 2013/0346753 A1* | 12/2013 | Boysen et al. | 713/168 |
| 2014/0068251 A1* | 3/2014 | Ignaci et al. | 713/158 |

OTHER PUBLICATIONS

Convergence, http://convergence.io/ A Thoughtcrime Labs Production, in association with IDS, 2011.  
Perspective Project http://perspectives-project.org/ downloaded Sep. 23, 2013.  
Certificate Patrol, https://addons.mozilla.org/en-us/firefox/addon/certificate-patrol/ downloaded Sep. 23, 2013.

* cited by examiner

*Primary Examiner* — Matthew Smithers  
(74) *Attorney, Agent, or Firm* — Ryan, Mason & Lewis, LLP

(57) ABSTRACT

Methods, apparatus and articles of manufacture for communicating trust models to relying parties are provided herein. A method includes receiving a first item of cryptographic information from a first entity, wherein said first item of cryptographic information is derived from a second item of cryptographic information provided by an authentication source; receiving a request for access to the first item of cryptographic information from a second entity, wherein the request comprises the second item of cryptographic information; and providing identification information associated with the first item of cryptographic information to the second entity in response to said request.

16 Claims, 4 Drawing Sheets

COMMUNICATING TRUST MODELS TO RELYING PARTIES

FIELD

The field relates generally to information technology, and more particularly to trust model management.

BACKGROUND

The secure sockets layer (SSL) trust model on the relying party (for example, a client) side faces challenges due, for example, to the growing list of trusted root certificate authorities (CAs) that are permitted to issue certificates for sub-CAs, which, in turn, issue certificates to web servers. If any root CA or sub-CA becomes compromised, the trust that a relying party can put into a web server certificate is severely compromised.

Existing alternate trust management approaches include requiring multiple notaries to validate an SSL server and/or monitoring changes in the certificate used by a server. However, such existing approaches fail to address aspects such as the behavior and/or experience level of the relying party user. For example, an experienced user might distrust a notary or research whether a certificate change is valid, whereas as a lesser experienced user may simply ignore a certificate trust warning. As such, it can be disadvantageous to leave such a decision in the exclusive control of the relying party user.

Additionally, existing alternative SSL trust models do not include means for the entity hosting or managing an SSL server to communicate to the relying party the particular trust model being used (for example, traditional, multiple notaries, etc.). As such, the relying party may be unaware of the trust model being used. Alternatively, even if an SSL certificate contains a marker informing the relying party to validate against multiple CAs, an attacker can potentially replace this certificate with a certificate for a compromised CA that follows a different trust model.

Accordingly, a need exists for techniques for communicating a chosen trust model to a relying party such that the relying party can subsequently validate the trust model.

SUMMARY

One or more illustrative embodiments of the present invention provide techniques for communicating trust models to relying parties.

In accordance with an aspect of the invention, a method is provided comprising the steps of: receiving a first item of cryptographic information from a first entity, wherein said first item of cryptographic information is derived from a second item of cryptographic information provided by an authentication source; receiving a request for access to the first item of cryptographic information from a second entity, wherein the request comprises the second item of cryptographic information; and providing identification information associated with the first item of cryptographic information to the second entity in response to said request.

In accordance with another aspect of the invention, a method is provided comprising the steps of: obtaining a second item of cryptographic information from an authentication source via a first entity; using said second item of cryptographic information to form a request to access a first item of cryptographic information, wherein said first item of cryptographic information is derived from the first entity; and obtaining identification information associated with the first item of cryptographic information in response to said request.

The trust model communication techniques of the illustrative embodiments overcome one or more of the problems associated with the conventional techniques described previously. These and other features and advantages of the present invention will become more readily apparent from the accompanying drawings and the following detailed description.

DETAILED DESCRIPTION

As will be described, the present invention, in one or more illustrative embodiments, provides techniques for communicating trust models to relying parties. At least one embodiment of the invention includes communicating a trust model to a relying party, wherein the relying party can then validate one or more decisions against this trust model. Decisions being validated against such a trust model can include, for example, determining the methodology that is to be used to validate a certificate.

Illustrative embodiments of the present invention will be described herein with reference to exemplary communication systems and associated processing devices. It is to be appreciated, however, that the invention is not restricted to use with the particular illustrative system and device configurations shown.

Accordingly, communication systems, as described herein, can be broadly construed so as to encompass any type of system in which multiple processing devices can communicate with one another. Also, the term cryptographic device, as used herein, is intended to be construed broadly so as to encompass any type of processing device and/or computing device that incorporates cryptographic functionality (such as a computer, server, mobile telephone, radio-frequency identification (RFID) tag or reader, authentication token, etc.). Additionally, cryptographic information, as described herein, can include certificates, trust models, trust model identifiers, etc.

As described herein, an aspect of the invention includes communication of SSL trust models. In at least one embodiment of the invention, this includes defining common definitions of trust models across multiple entities and/or components. Such an embodiment includes defining a unique identifier (ID) for each existing trust model. For example an identifier of "{traditional}" can be used for a built-in root CA model currently in use, an identifier of "{multiple roots}" can be used for new trust models relying on multiple root CAs, etc.

At least one embodiment of the invention additionally includes determining and/or marking a separation of duty between CAs and a disseminator component (further detailed in connection with FIG. 1). In such an embodiment, the communication of a trust model that a relying party should use to validate a server SSL certificate is communicated outside of the SSL certificate trust path. Accordingly, the trust model ID is not part of the SSL server certificate or any CA certificate in the trust chain, as any one of these components can potentially become compromised.

Figure 1:
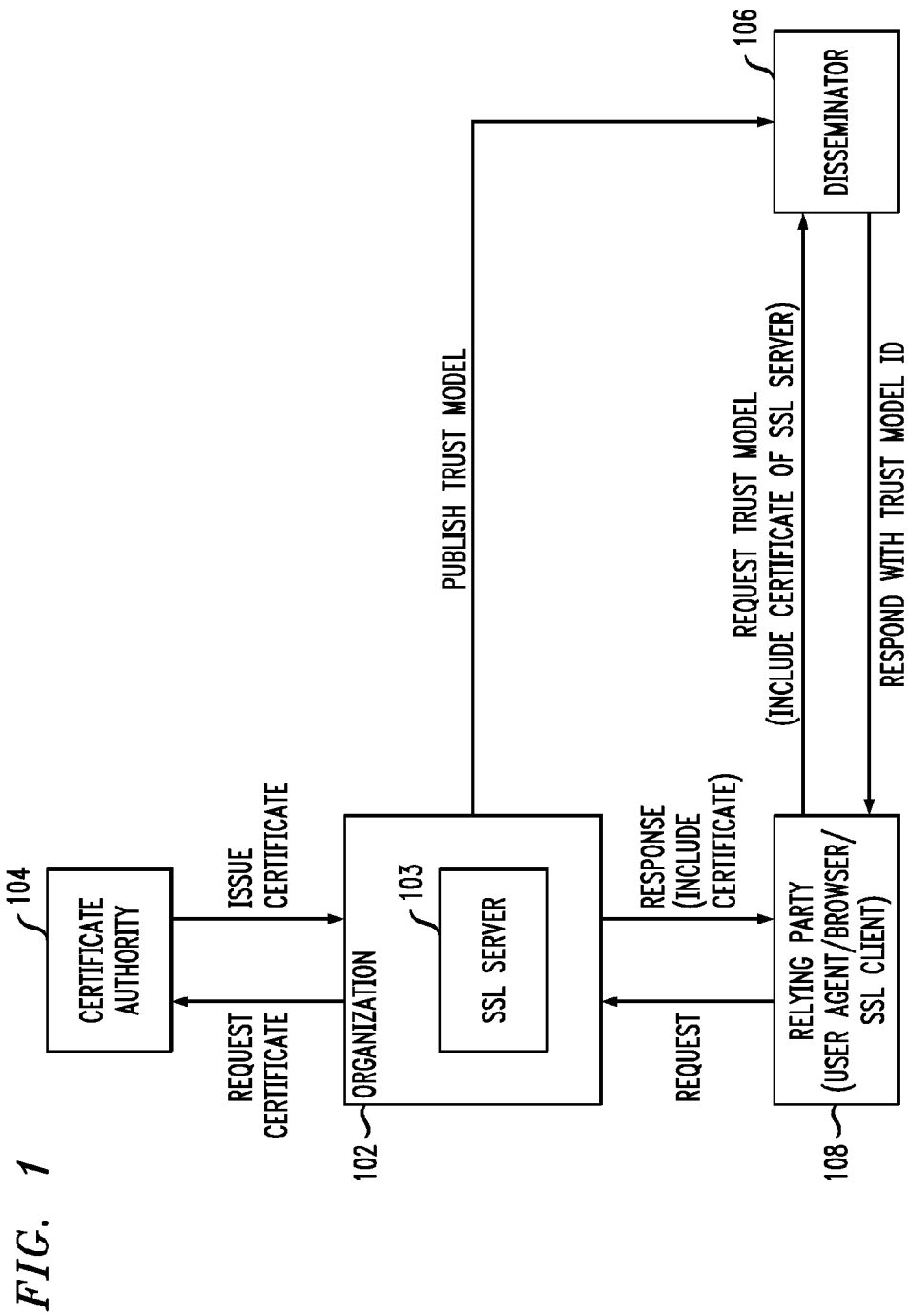
FIG. 1 is a diagram illustrating an example embodiment of the invention.

FIG. 1 is a diagram illustrating an example embodiment of the invention. By way of illustration, FIG. 1 depicts an organization 102, which includes an SSL server 103. As used herein (particularly, as in connection with FIG. 1 and FIG. 2), an organization can include any entity operating an SSL server such as, for example, an electronic commerce (e-commerce) system, a virtual private network (VPN) server (SSL-VPNs), government agencies, a service provided by a car, a smart meter or a component of a smart grid, etc.

Additionally, FIG. 1 also depicts a certificate authority component 104, a disseminator component 106 and a relying party component 108. As used herein, a disseminator component is the component that communicates the trust model. Moreover, a disseminator component will answer to requests made by relying parties to retrieve the trust model for a given SSL certificate. The relying party component 108 can include, for example, a user agent, a browser and/or an SSL relying party.

As illustrated, FIG. 1 depicts the organization 102 requesting a certificate for its SSL server 103 from the certificate authority component 104, and the certificate authority component 104 issuing the certificate to the organization 102. Additionally, in accordance with the example embodiment depicted in FIG. 1, the organization 102 decides on a trust model in connection with the issued certificate and publishes the trust model to the disseminator component 106.

FIG. 1 also depicts the relying party component 108 requesting access to the SSL server 103 from the organization 102, and the organization 102 providing a response to the relying party component 108, wherein the response includes the certificate issued to the organization 102 by the certificate authority component 104. Further, FIG. 1 depicts the relying party component 108 submitting a request for the trust model to the disseminator component 106, wherein the request includes, for example, the certificate of the SSL server 103 that the relying party component 108 received from the organization 102. The request can also include, by way of example, a hash of the certificate of the SSL server, an internet protocol (IP) address or a domain name system (DNS) name or a combination thereof. More generally, the request can include any item that can enable the disseminator to identify the SSL server uniquely. In response to this request, the disseminator component 106 responds to the relying party component 108 with an identifier (ID) of the trust model that the disseminator component 106 received from the organization 102.

Additionally, in at least one embodiment of the invention, the relying party 108 can submit the request to the disseminator 106 prior to contacting the SSL server 103. In such an embodiment, the relying party 108 can query the disseminator 106 for the trust model and (optionally) the certificate hash of the SSL server that is to be contacted. The request, as described above, includes information that enables the disseminator 106 to identify the SSL server that is to be contacted. Such a request can be sent by submitting the SSL server's IP address, DNS name or other information that is available to the relying party 108.

As noted above, at least one embodiment of the invention includes the use of a built-in list of trust model disseminators 106, such as illustrated in FIG. 1. In such an embodiment, communicating a trust model to the relying party 108 includes permitting the relying party 108 to query one or multiple services (also referred to herein as disseminators) during certificate validation. As detailed in FIG. 1, the disseminators respond to such relying party queries with the trust model that the SSL server 103 supports and that should be enforced by the relying party 108.

In at least one embodiment of the invention, a disseminator (such as component 106 in FIG. 1) can be hosted by browser vendors or other neutral parties (that is, a trusted entity that did not participate in the issuing of the certificate to be validated). As illustrated in FIG. 1, a relying party component 108 would request the trust model ID from a disseminator by sending the SSL server certificate (or a hash thereof) to the disseminator.

Further, in at least one embodiment of the invention, communication between the relying party and the disseminator is secured, for example, via use of digital signatures of the messages communicated between the relying party and the disseminator. Additionally, the material to be used in validating the responses between the relying party and the disseminator (such as the address of the disseminator, etc.) can be hardcoded into the relying party component. In such an instance, a browser vendor can include the relevant cryptographic information in the browser so that the responses of the disseminators can be validated. In one or more embodiments of the invention, communication between the relying party and the SSL server can also be secured.

Also, in accordance with at least one embodiment of the invention, the decision of which disseminator to contact (out of potentially multiple disseminators) is left to the relying party. The relying party may, by way of example, make such a decision based on a determination as to which disseminator is the fastest with respect to ping time (that is, a determination as to how much latency is associated with a remote site). Additionally, in one or more embodiments of the invention, if multiple disseminators are defined, the relying party can select one at random, thereby potentially preventing and/or limiting trouble from one compromised disseminator. Additionally, at least one embodiment of the invention includes implementation of a chain of multiple disseminators, wherein the relying party identifies and/or contacts only one of these multiple disseminators. That one disseminator, in turn, would contact an additional one of the multiple disseminators should the one disseminator have no information pertaining to the SSL server certificate in question.

Further, messages between the relying party and a disseminator can be cached at the relying party (for example, the browser) in one or more embodiments of the invention to decrease delay and traffic for subsequent visits to the same SSL server.

Figure 2:
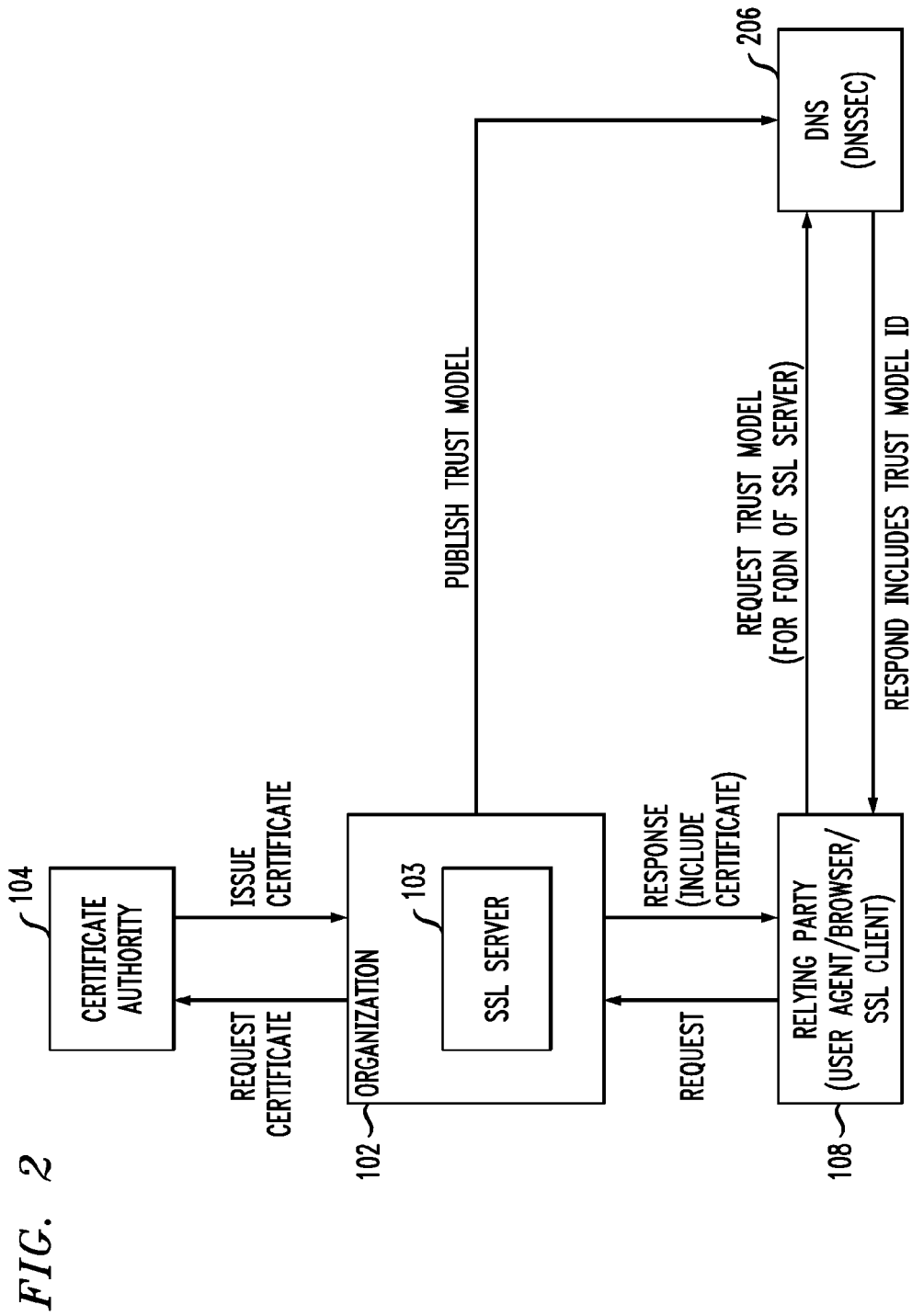
FIG. 2 is a diagram illustrating an example embodiment of the invention.

FIG. 2 is a diagram illustrating an example embodiment of the invention. By way of illustration, FIG. 2 depicts organization 102, which includes SSL server 103. Additionally, FIG. 2 depicts a certificate authority component 104, a domain name system (DNS) component 206 secured with Domain Name System Security Extensions (DNSsec), and a relying party component 108. Similar to FIG. 1, the relying party component 108 can include, for example, a user agent, a browser and/or an SSL relying party.

As also illustrated in FIG. 1, FIG. 2 depicts the organization 102 requesting a certificate for its SSL server 103 from the certificate authority component 104, and the certificate authority component 104 issuing the certificate to the organization 102. Additionally, the organization 102 decides on a trust model in connection with the issued certificate(s) and publishes the trust model to the DNS component 206.

FIG. 2 also depicts the relying party component 108 requesting access to the SSL server 103 from the organization 102, and the organization 102 providing a response to the relying party component 108, wherein the response includes the certificate issued to the organization 102 by the certificate authority component 104. Further, FIG. 2 depicts the relying party component 108 submitting a request to the DNS component 206 for the trust model for the fully qualified domain name (FQDN) of the SSL server 103, wherein the request includes the certificate of the SSL server 103 that the relying party component 108 received from the organization 102. In response to this request, the DNS component 206 responds to the relying party component 108 with an ID of the trust model that the disseminator component 106 received from the organization 102.

Additionally, in at least one embodiment of the invention, the relying party 108 can submit the request to the DNS component 206 prior to contacting the SSL server 103. In such an embodiment, the relying party 108 sends at least the FQDN of the SSL server to the DNS component 206.

Accordingly, as detailed in FIG. 2, at least one embodiment of the invention includes utilization of DNSsec-enabled DNS servers seeded with the appropriate trust model ID by the certificate holder. In this example embodiment, the certificate holder is the entity with the matching private key, namely, the SSL server. The trust model ID can be inserted, for example, into a newly-defined resource record (RR) inside a resource record Set (RRset). Storage of the trust model ID can occur at the DNSsec service (for example, an Internet provider).

Accordingly, both the example embodiment of the invention depicted in FIG. 1 and the example embodiment of the invention depicted in FIG. 2 provide a mechanism to publish and query trust model IDs to relying parties. While similarities exist between the two example embodiments, differences also exist. For example, in hosting the service, the disseminator-based embodiment depicted in FIG. 1 includes the use of a newly-created service which requires secure hosting, while the DNSsec-based embodiment depicted in FIG. 2 includes leveraging existing infrastructure. With respect to trust root location, the disseminator-based embodiment depicted in FIG. 1 includes utilizing a browser or other type of SSL client (specifically, a list of disseminators), while the DNSsec-based embodiment depicted in FIG. 2 includes utilizing an operating system (OS) (specifically, a list of trusted DNSsec certificates).

Figure 3:
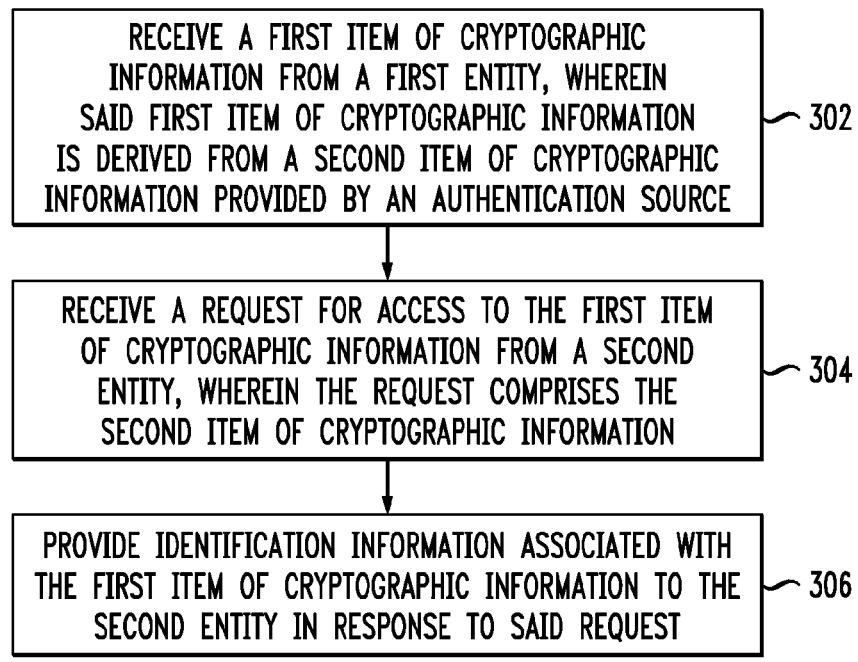
FIG. 3 is a flow diagram illustrating techniques according to an embodiment of the invention.

FIG. 3 is a flow diagram illustrating techniques according to an embodiment of the present invention. Step 302 includes receiving a first item of cryptographic information from a first entity, wherein said first item of cryptographic information is derived from a second item of cryptographic information provided by an authentication source. The first item of cryptographic information can include a trust model. The second item of cryptographic information can include a certificate (for example, a certificate for a server associated with the first entity). Additionally, the authentication source can include a certificate authority.

Step 304 includes receiving a request for access to the first item of cryptographic information from a second entity, wherein the request comprises the second item of cryptographic information. The second entity can include a relying party.

Step 306 includes providing identification information associated with the first item of cryptographic information to the second entity in response to said request. The providing step can include providing said identification information associated with the first item of cryptographic information to the second entity via a secured communication. The secured communication can include, for example, using one or more digital signatures as well as hard-coding into the second entity one or more items to be used in validating said provided identification information.

The techniques depicted in FIG. 3 can additionally include caching the provided identification information. Also, the techniques depicted in FIG. 3 can include communicating with a third entity for one or more items of information pertaining to said second item of cryptographic information. In at least one embodiment of the invention, the third entity includes a disseminator component.

Further, in at least one embodiment of the invention, steps 302, 304 and 306 can be carried out by a disseminator component. In one or more additional embodiments of the invention, steps 302, 304 and 306 can be carried out by a DNS component secured with domain name system security extensions (DNSsec). In such embodiments, a request for access to the first item of cryptographic information from a second entity can include a request to the DNS component for a fully qualified domain name of a server associated with the first entity.

Figure 4:
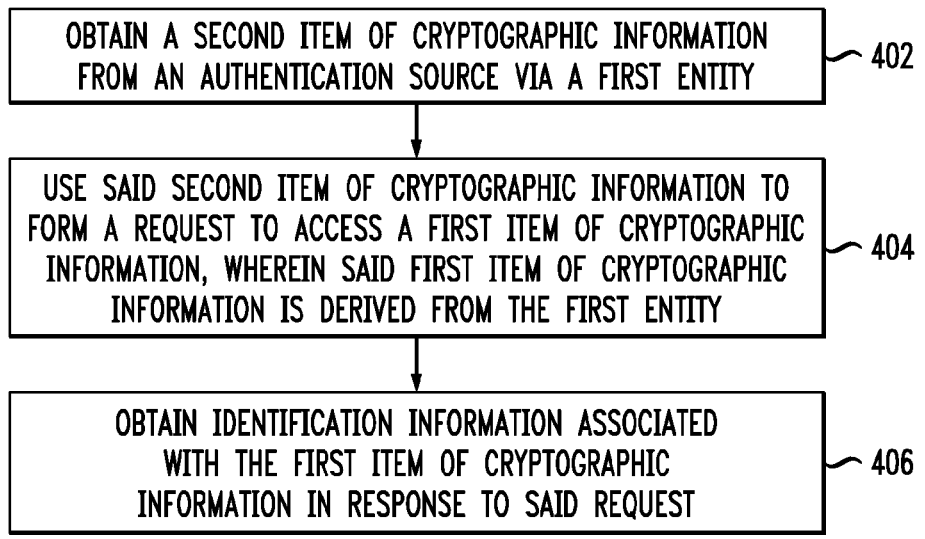
FIG. 4 is a flow diagram illustrating techniques according to an embodiment of the invention.

FIG. 4 is a flow diagram illustrating techniques according to an embodiment of the invention. Step 402 includes obtaining a second item of cryptographic information from an authentication source via a first entity. Step 404 includes using said second item of cryptographic information to form a request to access a first item of cryptographic information, wherein said first item of cryptographic information is derived from the first entity. Step 406 includes obtaining identification information associated with the first item of cryptographic information in response to said request. In at least one embodiment of the invention (such as depicted in FIG. 4), the first item of cryptographic information can include a trust model, and the second item of cryptographic information can include a certificate for a server associated with the first entity.

Techniques of the type described herein may be implemented in a wide variety of different applications. One exemplary communication system application that may incorporate such techniques is described with reference to FIG. 5.

Figure 5:
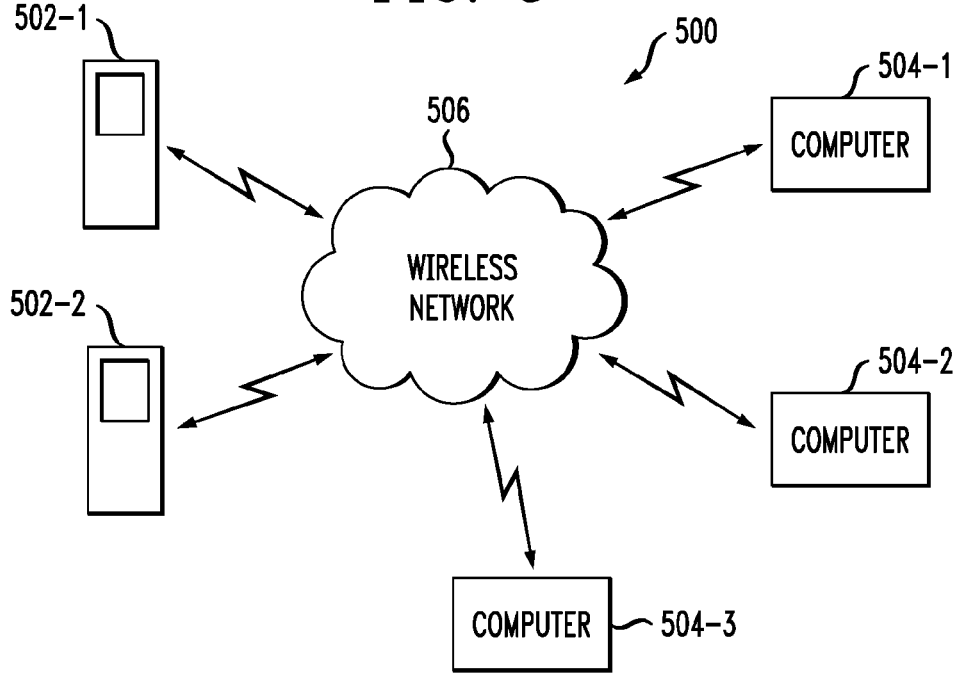
FIG. 5 show exemplary embodiments of other communication systems that may incorporate functionality of at least one embodiment of the invention.

Referring initially to FIG. 5, a communication system 500 comprises a plurality of mobile telephones 502-1 and 502-2 and computers 504-1, 504-2 and 504-3, configured to communicate with one another over a network 506.

Any two or more of the devices 502 and 504 may correspond to cryptographic devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor. Further, in connection with at least one embodiment of the invention, and as detailed herein, cryptographic modules (such as the first cryptographic module, the second cryptographic module and the third cryptographic module) can be resident on a disseminator component and/or a DNS component.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
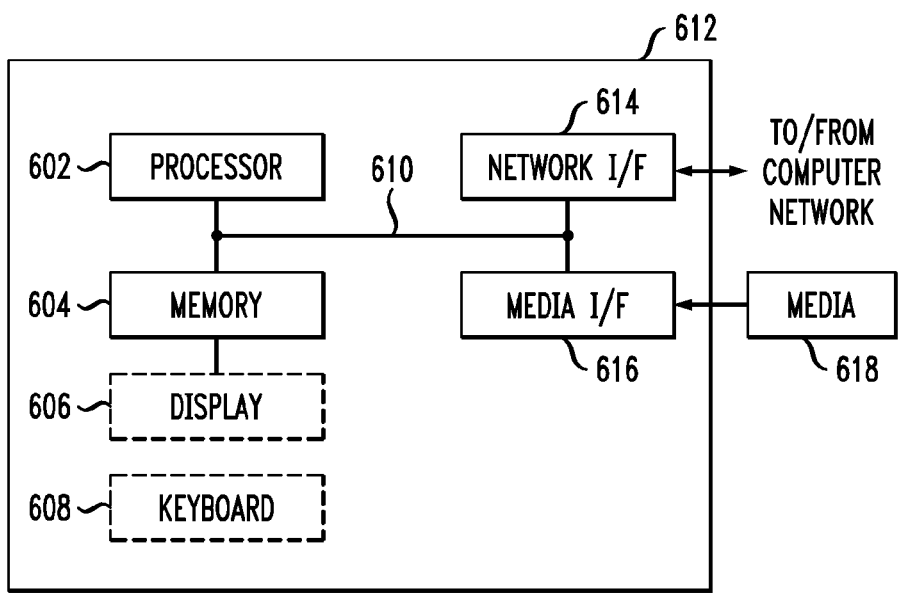
FIG. 6 is a system diagram of an exemplary computing device on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from trust model communication techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
receiving a first item of cryptographic information from a first entity, wherein said first item of cryptographic information comprises a particular trust model, from a collection of existing trust models, associated with a second item of cryptographic information provided by an authentication source, and wherein said second item of cryptographic information comprises a certificate;
receiving a request for access to the first item of cryptographic information from a second entity, wherein the request comprises the second item of cryptographic information; and
providing identification information associated with the first item of cryptographic information to the second entity in response to said request for use in identifying the particular trust model to be used in validating the certificate;
wherein at least one of said receiving the first item of cryptographic information, said receiving a request, and said providing is carried out by a computing device.

2. The method of claim 1, wherein said certificate comprises a certificate for a server associated with the first entity.

3. The method of claim 1, wherein said authentication source comprises a certificate authority.

4. The method of claim 1, wherein said second entity comprises a relying party.

5. The method of claim 1, wherein said providing comprises providing said identification information associated with the first item of cryptographic information to the second entity via a secured communication.

6. The method of claim 5, wherein said providing via secured communication comprises using one or more digital signatures.

7. The method of claim 5, wherein said providing via secured communication comprises hard-coding into the second entity one or more items to be used in validating said provided identification information.

8. The method of claim 1, further comprising:
communicating with a third entity for one or more items of information pertaining to said second item of cryptographic information.

9. The method of claim 8, wherein said third entity comprises a disseminator component.

10. The method of claim 1, further comprising:
caching said provided identification information.

11. The method of claim 1, wherein said receiving a first item of cryptographic information from a first entity, said receiving a request for access to the first item of cryptographic information from a second entity, and said providing identification information associated with the first item of cryptographic information to the second entity are carried out by a disseminator component.

12. The method of claim 1, wherein said receiving a first item of cryptographic information from a first entity, said receiving a request for access to the first item of cryptographic information from a second entity, and said providing identification information associated with the first item of cryptographic information to the second entity are carried out by a domain name system (DNS) component secured with domain name system security extensions (DNSsec).

13. The method of claim 12, wherein said request for access to the first item of cryptographic information from a second entity comprises a request to the domain name system (DNS) component for a fully qualified domain name of a server associated with the first entity.

14. An article of manufacture comprising a non-transitory processor-readable storage medium having processor-readable instructions tangibly embodied thereon which, when implemented, cause a processor to carry out the steps of the method of claim 1.

15. An apparatus comprising:
a memory; and
at least one processor coupled to the memory; and
a plurality of modules executing on the at least one processor, wherein the plurality of modules comprise:
 a first cryptographic module configured to receive a first item of cryptographic information from a first entity, wherein said first item of cryptographic information comprises a particular trust model, from a collection of existing trust models, associated with a second item of cryptographic information provided by an authentication source, and wherein said second item of cryptographic information comprises a certificate;
 a second cryptographic module configured to receive a request for access to the first item of cryptographic information from a second entity, wherein the request comprises the second item of cryptographic information; and
 a third cryptographic module configured to provide identification information associated with the first item of cryptographic information to the second entity in response to said request for use in identifying the particular trust model to be used in validating the certificate.

16. A method comprising:
obtaining a second item of cryptographic information from an authentication source via a first entity, wherein said second item of cryptographic information comprises a certificate for a server associated with the first entity;
using said second item of cryptographic information to form a request to access a first item of cryptographic information, wherein said first item of cryptographic information comprises a particular trust model, from a collection of existing trust models, associated with the second item of cryptographic information and is derived from the first entity; and
obtaining identification information associated with the first item of cryptographic information in response to said request, wherein said identification information comprises information for use in identifying the particular trust model to be used in validating the certificate;
wherein at least one of said obtaining the second item of cryptographic information, said using, and said obtaining identification information is carried out by a computing device.

* * * * *